United States Patent
Roberts et al.

(10) Patent No.: US 10,099,597 B2
(45) Date of Patent: Oct. 16, 2018

(54) PORTABLE HOIST ASSEMBLY

(71) Applicants: Tommy Roberts, Jacksonville, FL (US); Larry Brown, Jacksonville, FL (US)

(72) Inventors: Tommy Roberts, Jacksonville, FL (US); Larry Brown, Jacksonville, FL (US)

(*) Notice: Subject to any disclaimer, the term of this patent is extended or adjusted under 35 U.S.C. 154(b) by 31 days.

(21) Appl. No.: 15/240,452

(22) Filed: Aug. 18, 2016

(65) Prior Publication Data

US 2018/0050622 A1 Feb. 22, 2018

(51) Int. Cl.
*B60P 1/04* (2006.01)
*B60P 1/54* (2006.01)
*B62D 63/06* (2006.01)

(52) U.S. Cl.
CPC .......... *B60P 1/5423* (2013.01); *B62D 63/064* (2013.01)

(58) Field of Classification Search
CPC .............................. B60P 1/5428; B60P 1/5433
USPC ................................ 414/334, 540, 486, 546
See application file for complete search history.

(56) References Cited

U.S. PATENT DOCUMENTS

| | | | |
|---|---|---|---|
| 2,627,983 A | 2/1953 | Lathers, Jr. | |
| 3,599,812 A | 8/1971 | Hasstedt | |
| 3,760,953 A | 9/1973 | Cibin | |
| 4,202,453 A * | 5/1980 | Wilkes, Jr. | B66C 23/54 180/235 |
| 5,480,041 A | 1/1996 | Turner | |
| D376,885 S | 12/1996 | Carey | |
| 5,829,605 A * | 11/1998 | Poitras | B60P 3/125 212/180 |
| 6,065,621 A * | 5/2000 | Fatemi | B66C 23/48 212/264 |

* cited by examiner

*Primary Examiner* — Saul Rodriguez
*Assistant Examiner* — Willie Berry, Jr.

(57) ABSTRACT

A portable hoist assembly for lifting, relocating and lowering loads includes a trailer that is both wheeled and configured to couple to a vehicle. A power module, a lift arm and an actuator are coupled to the trailer. The actuator is operationally coupled to the power module and the lift arm. A fastener is operationally coupled proximate to a second end of the lift arm. The fastener is configured to couple the lift arm to a load. The actuator is positioned to motivate the lift arm and the fastener upwardly and downwardly. The load that is coupled to the lift arm is elevated from a first resting position to a raised position, repositioned by movement of the trailer, and lowered from the raised position to a second resting position.

14 Claims, 4 Drawing Sheets

PORTABLE HOIST ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIE THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

(2) Description of Related Art Including Information Disclosed Under 37 CFR 1.97 and 1.98

The disclosure and prior art relates to hoist assemblies and more particularly pertains to a new hoist assembly for lifting, relocating and lowering loads.

BRIEF SUMMARY OF THE INVENTION

An embodiment of the disclosure meets the needs presented above by generally comprising a trailer that is both wheeled and configured to couple to a vehicle. A power module, a lift arm and an actuator are coupled to the trailer. The actuator is operationally coupled to the power module and the lift arm. A fastener is operationally coupled proximate to a second end of the lift arm. The fastener is configured to couple the lift arm to a load. The actuator is positioned to motivate the lift arm and the fastener upwardly, such that the load that is coupled to the lift arm is elevated from a first resting position to a raised position. The trailer is configured such that the trailer and the load are movable. The actuator is positioned to motivate the lift arm downwardly, such that the load is lowered from the raised position to a second resting position.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
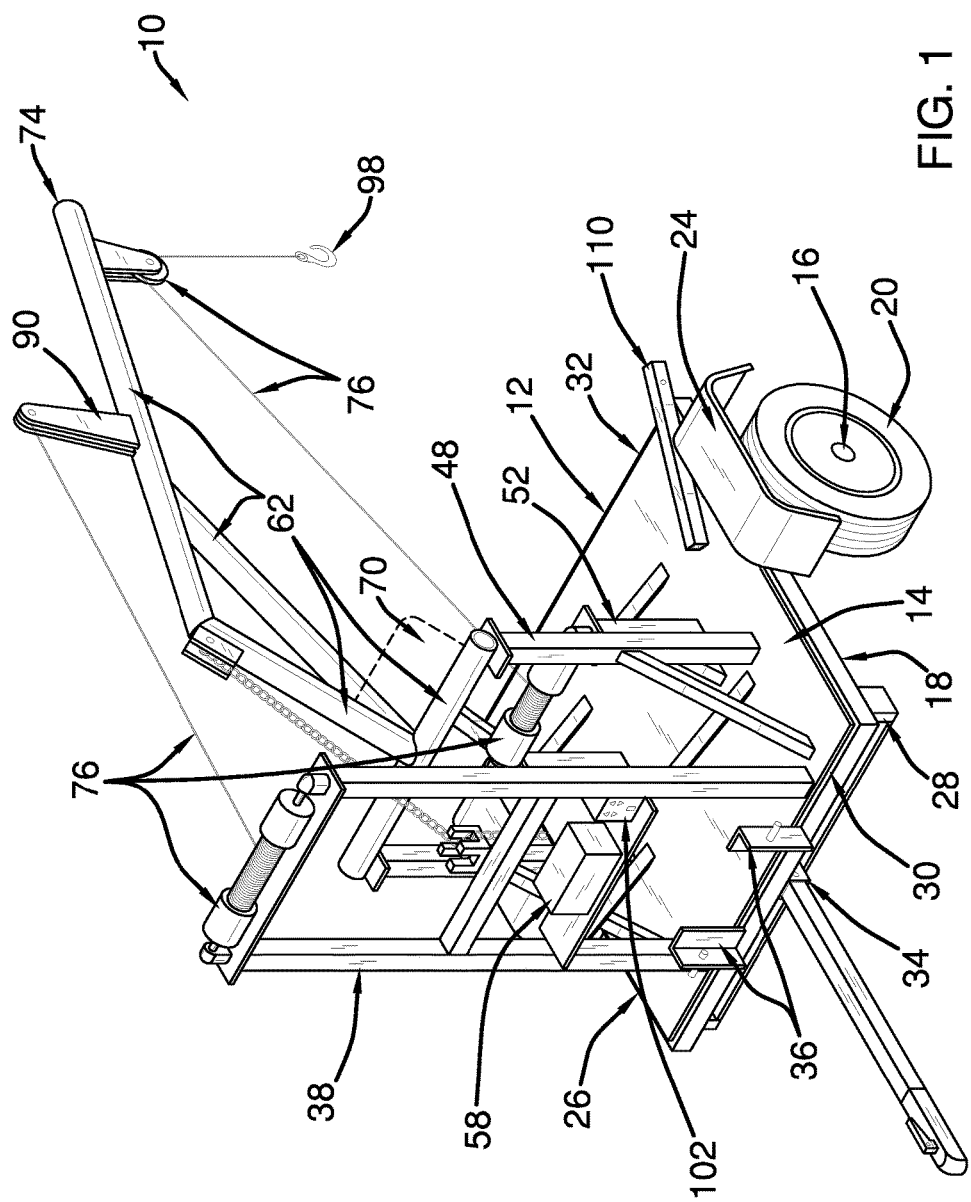
FIG. 1 is and isometric perspective view of a portable hoist assembly according to an embodiment of the disclosure.
Figure 2:
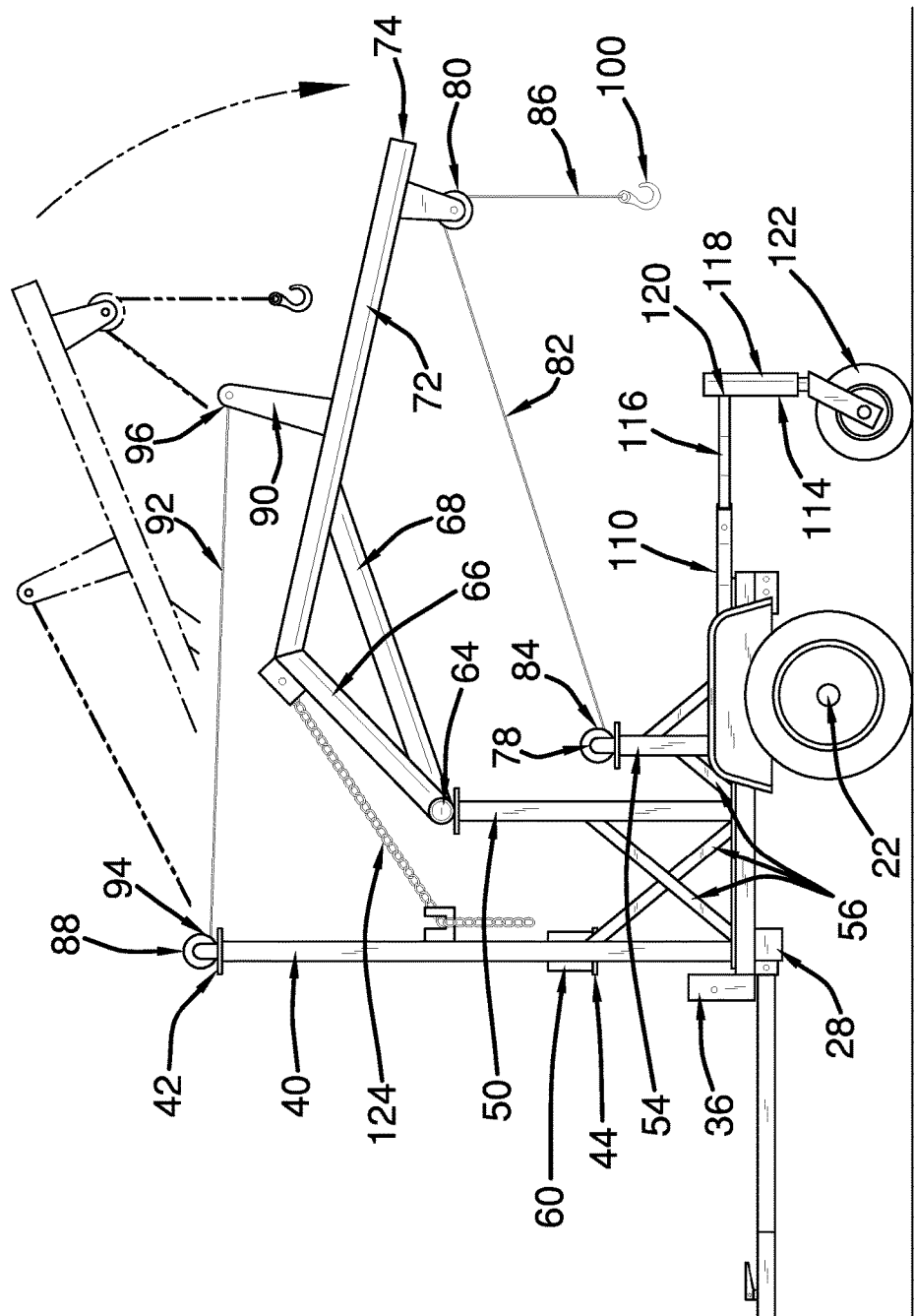
FIG. 2 is a side view of an embodiment of the disclosure.
Figure 3:
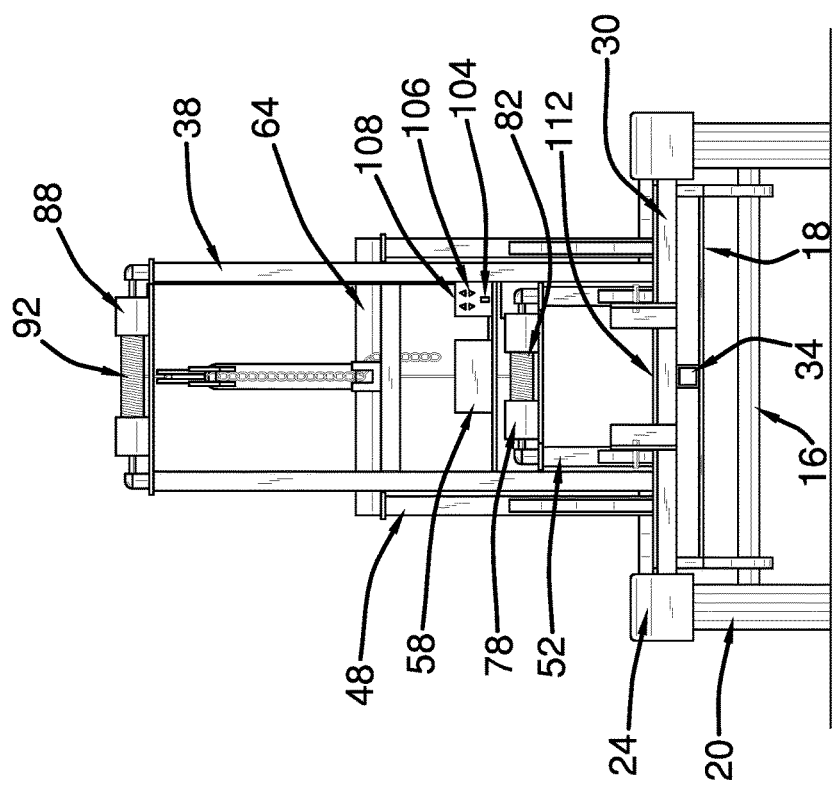
FIG. 3 is a front view of an embodiment of the disclosure.
Figure 4:
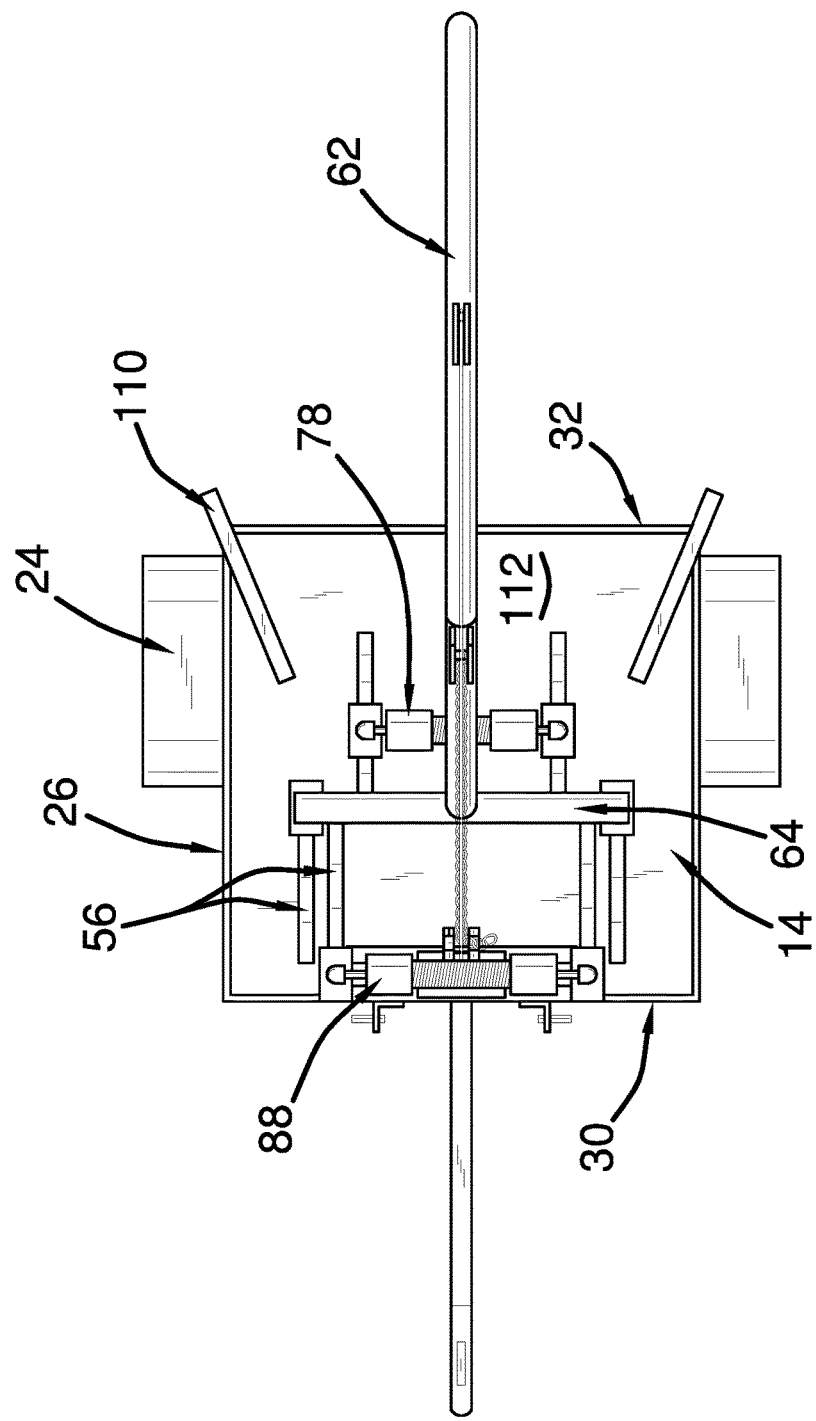
FIG. 4 is a top view of an embodiment of the disclosure.

With reference now to the drawings, and in particular to FIGS. 1 through 4 thereof, a new hoist assembly embodying the principles and concepts of an embodiment of the disclosure and generally designated by the reference numeral 10 will be described.

As best illustrated in FIGS. 1 through 4, the portable hoist assembly 10 generally comprises a trailer 12. The trailer 12 is wheeled. The trailer 12 is configured to couple to a vehicle, such that the trailer 12 is movable. The trailer 12 comprises a bed 14. The bed 14 is rigid. In one embodiment, the bed 14 is substantially squarely shaped.

An axle 16 is rotationally coupled to an underside 18 of the bed 14. A pair of wheels 20 is coupled singly to opposing ends 22 of the axle 16. Each of a pair of fenders 24 is coupled to a respective opposing side 26 of the bed 14 proximate to an associated wheel 20. The fenders 24 are coupled to the bed 14 such that the fenders 24 are configured to deflect debris that separates from the wheels 20 as the wheels 20 are rotated.

A pair of first tubes 28 is coupled to the underside 18 of the bed 14. The first tubes 28 are positioned, singly, parallel to and adjacent to a front end 30 and a back end 32 of the bed 14. The first tubes 28 are substantially rectangularly shaped when viewed longitudinally. Each first tube 28 is positioned on the bed 14 such that the first tube 28 is configured to insert a respective fork of a forklift arm 62.

A first receiver 34 is coupled to the underside 18 of the bed 14. The first receiver 34 is positioned on the front end 30 of the bed 14 equally distant from the opposing sides 26 of the bed 14. The first receiver 34 is configured to couple to a hitch. The first receiver 34 is positioned on the bed 14 such that the first receiver 34 is configured to couple to a hitch, such that the trailer 12 is couplable to the vehicle.

A pair of brackets 36 is coupled to and extends perpendicularly from the bed 14 adjacent to the front end 30. The brackets 36 are configured to couple to a three point hitch. The pair of brackets 36 is positioned on the bed 14 such that the pair of brackets 36 is configured to couple to a three point hitch, such that the trailer 12 is couplable to the vehicle.

A first vertical support 38 is coupled to and extends perpendicularly from the bed 14. The first vertical support 38 is positioned proximate to the front end 30. The first vertical support 38 comprises a pair of first columns 40 that is coupled to and extends perpendicularly from the bed 14.

A first plate 42 is coupled to and extends between the first columns 40 distal from the bed 14. A second plate 44 is coupled to and extends between the first columns 40. The second plate 44 is positioned between the bed 14 and the first plate 42. A crossbar 46 is coupled to and extends between the first columns 40. The crossbar 46 is positioned between the first plate 42 and the second plate 44.

A second vertical support 48 is coupled to and extends perpendicularly from the bed 14. The second vertical support 48 is positioned between the first vertical support 38 and the back end 32 of the bed 14. The second vertical support 48 is parallel to the first vertical support 38. The second vertical support 48 is dimensionally short than the first vertical support 38. The second vertical support 48 comprises a pair of second columns 50 that is coupled to and extends perpendicularly from the bed 14.

A third vertical support 52 is coupled to and extends perpendicularly from the bed 14. The third vertical support 52 is positioned between the second vertical support 48 and the back end 32 of the bed 14. The third vertical support 52 is parallel to the second vertical support 48. The third vertical support 52 is dimensionally short than the second vertical support 48. The third vertical support 52 comprises a pair of third columns 54 that is coupled to and extends perpendicularly from the bed 14.

In one embodiment, the assembly 10 comprises a plurality of buttresses 56. The plurality of buttresses 56 comprises buttresses 56 that are coupled singly to and extend between each first column 40 and the bed 14. These buttresses 56 extend from the first columns 40 toward the back end 32 of the bed 14. The plurality of buttresses 56 also comprises buttresses 56 that are coupled singly to and extend between each second column 50 and the bed 14. These buttresses 56 extend from the second columns 50 toward the front end 30 of the bed 14. The plurality of buttresses 56 also comprises buttresses 56 that are coupled singly to and extend between each third column 54 and the bed 14. These buttresses 56 extend from the third column 54 toward the back end 32 of the bed 14. The plurality of buttresses 56 also comprises buttresses 56 that are coupled singly to and extends between each the third column 54 and the bed 14. These buttresses 56 extend from the third column 54 toward the front end 30 of the bed 14.

A power module 58 is coupled to the trailer 12. The power module 58 comprises at least one battery 60. In one embodiment, the power module 58 is coupled to the crossbar 46.

A lift arm 62 is coupled to the trailer 12. The lift arm 62 comprises a pivot bar 64 that is pivotally coupled to and extends between the second columns 50 distal from the bed 14. A first bar 66 and a second bar 68 are coupled to and extend perpendicularly from the pivot bar 64. The second bar 68 extends transversely from a plane 70 defined by the pivot bar 64 and the first bar 66. A third bar 72 is coupled to and extends between the first bar 66 and the second bar 68 distal from the pivot bar 64. The third bar 72 extends linearly beyond the second bar 68 defining a second end 74 of the lift arm 62.

An actuator 76 is coupled to the trailer 12. The actuator 76 is operationally coupled to the power module 58 and the lift arm 62. In one embodiment, the actuator 76 comprises a first winch 78 that is coupled to and extends between the third columns 54 distal from the bed 14. A pulley 80 is coupled proximate to the second end 74 of the lift arm 62. The pulley 80 extends downwardly from the lift arm 62. A first cable 82 has a first terminus 84 and a second terminus 86. The first terminus 84 is coupled to the first winch 78. The first cable 82 is coiledly positionable around the first winch 78. The second terminus 86 of the first cable 82 is positioned through the pulley 80. A second winch 88 is coupled to and extends between the first columns 40 distal from the bed 14. A spacer bar 90 is coupled to and extends upwardly from the lift arm 62. The spacer bar 90 is positioned between the pulley 80 and the first columns 40. A second cable 92 has a first endpoint 94 and a second endpoint 96. The first endpoint 94 is coupled to the second winch 88. The second cable 92 is coiledly positionable around the second winch 88. The second endpoint 96 is coupled to the spacer bar 90 distal from the lift arm 62.

A fastener 98 is operationally coupled to the lift arm 62 proximate to the second end 74 of the lift arm 62. The fastener 98 is positioned on the lift arm 62 such that the fastener 98 is configured to couple the lift arm 62 to a load. In one embodiment, the fastener 98 comprises a hook 100. The hook 100 is coupled to the second terminus 86 of the first cable 82. The hook 100 is positioned on the first cable 82 such that the hook 100 is configured to couple to the load. The hook 100 and the load are motivated vertically upwardly and downwardly by motivation of the actuator 76 on the lift arm 62.

A control panel 102 is operationally coupled to the power module 58 and the actuator 76. The control panel 102 is positioned to motivate the actuator 76 to motivate the lift arm 62 to raise and lower the load. In one embodiment, the control panel 102 comprises an On/Off button 104 that is operationally coupled to the power module 58. A first Up/Down toggle switch 106 is operationally coupled to the first winch 78. A second Up/Down toggle switch 108 is operationally coupled to the second winch 88. The first Up/Down toggle switch 106 is positioned to motivate the first winch 78 to rotate, such that the fastener 98 and the load are raised and lowered. The second Up/Down toggle switch 108 is positioned to motivate the second winch 88 to rotate to raise and lower the lift arm 62.

A pair of second tubes 110 is longitudinally coupled to a topside 112 of the bed 14. The second tubes 110 are positioned singly adjacent to each opposing side 26 of the bed 14. The second tubes 110 extend transversely from the back end 32 of the bed 14. The second tubes 110 extend in parallel to the bed 14. The second tubes 110 are substantially rectangularly shaped when viewed longitudinally.

Each of a pair of outriggers 114 comprises a third tube 116. The third tube 116 is complementary to a respective second tube 110, such that the third tube 116 is insertable into and slidably couplable to the respective second tube 110. A fourth tube 118 is coupled to and extends perpendicularly from an end 120 of the third tube 116. A roller 122 is coupled to the fourth tube 118 distal from the third tube 116. The second tube 110 is positioned on the bed 14 such that the second tube 110 is configured to insert the third tube 116 of the outrigger 114. The outrigger 114 is coupled to the bed 14 and configured to stabilize the bed 14.

A chain 124 is coupled to the lift arm 62. The chain 124 is reversibly couplable to the crossbar 46. The chain 124 is positioned on the lift arm 62 such that the chain 124 is couplable to the crossbar 46 to immobilize the lift arm 62.

In use, the fastener 98 is positioned on the lift arm 62 such that the fastener 98 is configured to couple the lift arm 62 to a load. The actuator 76 is positioned to motivate the lift arm 62 and the fastener 98 upwardly, such that the load that is coupled to the lift arm 62 is elevated from a first resting position to a raised position. The trailer 12 is wheeled and couplable to a vehicle, such that the trailer 12 and the load are movable. The actuator 76 is positioned to motivate the lift arm 62 and the fastener 98 downwardly, such that the load that is coupled to the lift arm 62 is lowered from the raised position to a second resting position.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

The invention claimed is:

1. A portable hoist assembly comprising:
   a trailer, said trailer being wheeled, said trailer being configured to couple to a vehicle, such that said trailer is movable, said trailer comprising
      a bed, said bed being rigid, said bed being substantially squarely shaped,
      an axle rotationally coupled to an underside of said bed, and
      a pair of wheels coupled singly to opposing ends of said axle;
   a power module coupled to said trailer;
   a lift arm coupled to said trailer;
   an actuator coupled to said trailer, said actuator being operationally coupled to said power module and said lift arm;
   a fastener operationally coupled to said lift arm proximate to a second end of said lift arm;
   wherein said fastener is positioned on said lift arm such that said fastener is configured to couple said lift arm to a load, wherein said actuator is positioned to motivate said lift arm and said fastener upwardly, such that the load coupled to said lift arm is elevated from a first resting position to a raised position, wherein said trailer is wheeled and couplable to a vehicle, such that said trailer and the load are movable, and wherein said actuator is positioned to motivate said lift arm and said fastener downwardly, such that the load coupled to said lift arm is lower from the raised position to a second resting position; and
   a pair of first tubes coupled to said underside of said bed, said first tubes being positioned, singly, parallel to and adjacent to a front end and a back end of said bed, said first tubes being substantially rectangularly shaped when viewed longitudinally, wherein each said first tube is positioned on said bed such that said first tube is configured for insertion of a respective fork of a forklift arm.

2. The assembly of claim 1, further including a pair of fenders, each said fender being coupled to a respective opposing side of said bed proximate to an associated said wheel, wherein said fenders are coupled to said bed such that said fenders are configured to deflect debris that separates from said wheels as said wheels are rotating.

3. The assembly of claim 1, further including a control panel operationally coupled to said power module and said actuator, wherein said control panel is positioned to motivate said actuator to motivate said lift arm to raise and lower the load.

4. A portable hoist assembly comprising:
   a trailer, said trailer being wheeled, said trailer being configured to couple to a vehicle, such that said trailer is movable, said trailer comprising
      a bed, said bed being rigid, said bed being substantially squarely shaped,
      an axle rotationally coupled to an underside of said bed, and
      a pair of wheels coupled singly to opposing ends of said axle;
   a power module coupled to said trailer;
   a lift arm coupled to said trailer;
   an actuator coupled to said trailer, said actuator being operationally coupled to said power module and said lift arm;
   a fastener operationally coupled to said lift arm proximate to a second end of said lift arm;
   wherein said fastener is positioned on said lift arm such that said fastener is configured to couple said lift arm to a load, wherein said actuator is positioned to motivate said lift arm and said fastener upwardly, such that the load coupled to said lift arm is elevated from a first resting position to a raised position, wherein said trailer is wheeled and couplable to a vehicle, such that said trailer and the load are movable, and wherein said actuator is positioned to motivate said lift arm and said fastener downwardly, such that the load coupled to said lift arm is lower from the raised position to a second resting position;
   a first receiver coupled to said underside of said bed, said first receiver being positioned on said front end of said bed equally distant from said opposing sides of said bed, said first receiver being configured for coupling to a hitch, wherein said first receiver is positioned on said bed such that said first receiver is configured to couple to a hitch, such that said trailer is couplable to the vehicle; and
   a pair of brackets coupled to and extending perpendicularly from said bed adjacent to said front end, said brackets being configured for coupling to a three point hitch, wherein said pair of brackets is positioned on said bed such that said pair of brackets is configured to couple to a three point hitch, such that said trailer is couplable to the vehicle.

5. A portable hoist assembly comprising:
   a trailer, said trailer being wheeled, said trailer being configured to couple to a vehicle, such that said trailer is movable, said trailer comprising
      a bed, said bed being rigid, said bed being substantially squarely shaped,
      an axle rotationally coupled to an underside of said bed, and
      a pair of wheels coupled singly to opposing ends of said axle;
   a power module coupled to said trailer;
   a lift arm coupled to said trailer;
   an actuator coupled to said trailer, said actuator being operationally coupled to said power module and said lift arm;

a fastener operationally coupled to said lift arm proximate to a second end of said lift arm;
wherein said fastener is positioned on said lift arm such that said fastener is configured to couple said lift arm to a load, wherein said actuator is positioned to motivate said lift arm and said fastener upwardly, such that the load coupled to said lift arm is elevated from a first resting position to a raised position, wherein said trailer is wheeled and couplable to a vehicle, such that said trailer and the load are movable, and wherein said actuator is positioned to motivate said lift arm and said fastener downwardly, such that the load coupled to said lift arm is lower from the raised position to a second resting position;
a first vertical support coupled to and extending perpendicularly from said bed, said first vertical support being positioned proximate to said front end, said first vertical support comprising:
    a pair of first columns coupled to and extending perpendicularly from said bed,
    a first plate coupled to and extending between said first columns distal from said bed,
    a second plate coupled to and extending between said first columns, said second plate being positioned between said bed and said first plate, and
    a crossbar coupled to and extending between said first columns, said crossbar being positioned between said first plate and said second plate;
a second vertical support coupled to and extending perpendicularly from said bed, said second vertical support being positioned between said first vertical support and said back end of said bed, said second vertical support being parallel to said first vertical support, said second vertical support being dimensionally short than said first vertical support, said second vertical support comprising a pair of second columns coupled to and extending perpendicularly from said bed;
a third vertical support coupled to and extending perpendicularly from said bed, said third vertical support being positioned between said second support and said back end of said bed, said third vertical support being parallel to said second vertical, said third vertical support being dimensionally short than said second vertical support, said third vertical support comprising a pair of third columns coupled to and extending perpendicularly from said bed.

6. The assembly of claim 5, further including a plurality of buttresses comprising:
    said buttresses coupled singly to and extending between each said first column and said bed, said buttresses extending from said first columns toward said back end of said bed;
    said buttresses coupled singly to and extending between each said second column and said bed, said buttresses extending from said second columns toward said front end of said bed;
    said buttresses coupled singly to and extending between each said third column and said bed, said buttresses extending from said third column toward said back end of said bed; and
    said buttresses coupled singly to and extending between each said third column and said bed, said buttresses extending from said third column toward said front end of said bed.

7. The assembly of claim 5, further comprising:
said power module comprising at least one battery; and
said power module being coupled to said crossbar.

8. The assembly of claim 5, further including said lift arm comprising:
    a pivot bar pivotally coupled to and extending between said second columns distal from said bed;
    a first bar coupled to and extending perpendicularly from said pivot bar,
    a second bar coupled to and extending perpendicularly from said pivot bar, said second bar extending transversely from a plane defined by said pivot bar and said first bar; and
    a third bar coupled to and extending between said first bar and said second bar distal from said pivot bar, said third bar extending linearly beyond said second bar defining a second end of said lift arm.

9. The assembly of claim 8, further including said actuator comprising
    a first winch coupled to and extending between said third columns distal from said bed;
    a pulley coupled proximate to said second end of said lift arm, said pulley extending downwardly from said lift arm;
    a first cable having a first terminus and a second terminus, said first terminus being coupled to said first winch, said first cable being coiledly positionable around said first winch, said second terminus of said first cable being positioned through said pulley;
    a second winch coupled to and extending between said first columns distal from said bed;
    a spacer bar coupled to and extending upwardly from said lift arm, said spacer bar being positioned between said pulley and said first columns; and
    a second cable having a first endpoint and a second endpoint, said first endpoint being coupled to said second winch, said second cable being coiledly positionable around said second winch, said second endpoint being coupled to said spacer bar distal from said lift arm.

10. The assembly of claim 9, further including said fastener comprising a hook, said hook being coupled to said second terminus of said first cable, wherein said hook is positioned on said first cable such that said hook is configured to couple to the load, wherein said hook and said load are motivated vertically upwardly and downwardly by motivation of said actuator on said lift arm.

11. The assembly of claim 9, further including a control panel comprising:
    an On/Off button operationally coupled to said power module;
    a first Up/Down toggle switch operationally coupled to said first winch;
    a second Up/Down toggle switch operationally coupled to said second winch; and
    wherein said first Up/Down toggle switch is positioned to motivate said first winch to rotate such that said fastener and the load are raised and lowered, wherein said second Up/Down toggle switch is positioned to motivate said second winch to rotate to raise and lower said lift arm.

12. The assembly of claim 5, further including a chain coupled to said lift arm, said chain being reversibly couplable to said crossbar, wherein said chain is positioned on said lift arm such that said chain is couplable to said crossbar such that said lift arm is immobilized.

13. A portable hoist assembly comprising:
    a trailer, said trailer being wheeled, said trailer being configured to couple to a vehicle, such that said trailer is movable;

a power module coupled to said trailer;
a lift arm coupled to said trailer;
an actuator coupled to said trailer, said actuator being operationally coupled to said power module and said lift arm;
a fastener operationally coupled to said lift arm proximate to a second end of said lift arm; and
wherein said fastener is positioned on said lift arm such that said fastener is configured to couple said lift arm to a load, wherein said actuator is positioned to motivate said lift arm and said fastener upwardly, such that the load coupled to said lift arm is elevated from a first resting position to a raised position, wherein said trailer is wheeled and couplable to a vehicle, such that said trailer and the load are movable, and wherein said actuator is positioned to motivate said lift arm and said fastener downwardly, such that the load coupled to said lift arm is lower from the raised position to a second resting position;
a pair of second tubes longitudinally coupled to a topside of said bed, said second tubes being positioned singly adjacent to each said opposing side, said second tubes extending transversely from said back end of said bed, said second tubes extending in parallel to said bed, said second tubes being substantially rectangularly shaped when viewed longitudinally;
a pair of outriggers, each said outrigger comprising:
    a third tube, said third tube being complementary to a respective said second tube such that said third tube is insertable into and slidably couplable to said respective said second tube,
    a fourth tube coupled to and extending perpendicularly from an end of said third tube, and
    a roller coupled to said fourth tube distal from said third tube, and
wherein said second tube is positioned on said bed such that said second tube is configured for insertion of said third tube of said outrigger such that said outrigger is coupled to said bed, wherein said outriggers are configured stabilize said bed.

14. A portable hoist assembly comprising:
a trailer, said trailer being wheeled, said trailer being configured to couple to a vehicle, such that said trailer is movable, said trailer comprising:
    a bed, said bed being rigid, said bed being substantially squarely shaped,
    an axle rotationally coupled to an underside of said bed,
    a pair of wheels coupled singly to opposing ends of said axle,
    a pair of fenders, each said fender being coupled to a respective opposing side of said bed proximate to an associated said wheel, wherein said fenders are coupled to said bed such that said fenders are configured to deflect debris that separates from said wheels as said wheels are rotating,
    a pair of first tubes coupled to said underside of said bed, said first tubes being positioned, singly, parallel to and adjacent to a front end and a back end of said bed, said first tubes being substantially rectangularly shaped when viewed longitudinally, wherein each said first tube is positioned on said bed such that said first tube is configured for insertion of a respective fork of a forklift arm,
    a first receiver coupled to said underside of said bed, said first receiver being positioned on said front end of said bed equally distant from said opposing sides of said bed, said first receiver being configured for coupling to a hitch, wherein said first receiver is positioned on said bed such that said first receiver is configured to couple to a hitch, such that said trailer is couplable to the vehicle, and
    a pair of brackets coupled to and extending perpendicularly from said bed adjacent to said front end, said brackets being configured for coupling to a three point hitch, wherein said pair of brackets is positioned on said bed such that said pair of brackets is configured to couple to a three point hitch, such that said trailer is couplable to the vehicle;
a first vertical support coupled to and extending perpendicularly from said bed, said first vertical support being positioned proximate to said front end, said first vertical support comprising:
    a pair of first columns coupled to and extending perpendicularly from said bed,
    a first plate coupled to and extending between said first columns distal from said bed,
    a second plate coupled to and extending between said first columns, said second plate being positioned between said bed and said first plate, and
    a crossbar coupled to and extending between said first columns, said crossbar being positioned between said first plate and said second plate;
a second vertical support coupled to and extending perpendicularly from said bed, said second vertical support being positioned between said first vertical support and said back end of said bed, said second vertical support being parallel to said first vertical support, said second vertical support being dimensionally short than said first vertical support, said second vertical support comprising a pair of second columns coupled to and extending perpendicularly from said bed;
a third vertical support coupled to and extending perpendicularly from said bed, said third vertical support being positioned between said second support and said back end of said bed, said third vertical support being parallel to said second vertical, said third vertical support being dimensionally short than said second vertical support, said third vertical support comprising a pair of third columns coupled to and extending perpendicularly from said bed;
a plurality of buttresses comprising:
    said buttresses coupled singly to and extending between each said first column and said bed, said buttresses extending from said first columns toward said back end of said bed,
    said buttresses coupled singly to and extending between each said second column and said bed, said buttresses extending from said second columns toward said front end of said bed,
    said buttresses coupled singly to and extending between each said third column and said bed, said buttresses extending from said third column toward said back end of said bed, and
    said buttresses coupled singly to and extending between each said third column and said bed, said buttresses extending from said third column toward said front end of said bed;
a power module coupled to said trailer, said power module comprising at least one battery, said power module being coupled to said crossbar;
a lift arm coupled to said trailer, said lift arm comprising:
    a pivot bar pivotally coupled to and extending between said second columns distal from said bed, a first bar coupled to and extending perpendicularly from said pivot bar, a second bar coupled to and extending perpendicularly from said pivot bar, said second bar extending transversely from a plane defined by said pivot bar and said first bar, and a third bar coupled to and extending between said first bar and said second bar distal from said pivot bar, said third bar extending linearly beyond said second bar defining a second end of said lift arm;

an actuator coupled to said trailer, said actuator being operationally coupled to said power module and said lift arm, said actuator comprising:

a first winch coupled to and extending between said third columns distal from said bed, a pulley coupled proximate to said second end of said lift arm, said pulley extending downwardly from said lift arm, a first cable having a first terminus and a second terminus, said first terminus being coupled to said first winch, said first cable being coiledly positionable around said first winch, said second terminus of said first cable being positioned through said pulley, a second winch coupled to and extending between said first columns distal from said bed, a spacer bar coupled to and extending upwardly from said lift arm, said spacer bar being positioned between said pulley and said first columns, and a second cable having a first endpoint and a second endpoint, said first endpoint being coupled to said second winch, said second cable being coiledly positionable around said second winch, said second endpoint being coupled to said spacer bar distal from said lift arm;

a fastener operationally coupled to said lift arm proximate to said second end of said lift arm, wherein said fastener is positioned on said lift arm such that said fastener is configured to couple said lift arm to a load, said fastener comprising a hook, said hook being coupled to said second terminus of said first cable, wherein said hook is positioned on said first cable such that said hook is configured to couple to the load, wherein said hook and said load are motivated vertically upwardly and downwardly by motivation of said actuator on said lift arm;

a control panel operationally coupled to said power module and said actuator, wherein said control panel is positioned to motivate said actuator to motivate said lift arm to raise and lower the load, said control panel comprising:

an On/Off button operationally coupled to said power module, a first Up/Down toggle switch operationally coupled to said first winch, a second Up/Down toggle switch operationally coupled to said second winch, and wherein said first Up/Down toggle switch is positioned to motivate said first winch to rotate such that said fastener and the load are raised and lowered, wherein said second Up/Down toggle switch is positioned to motivate said second winch to rotate to raise and lower said lift arm;

a pair of second tubes longitudinally coupled to a topside of said bed, said second tubes being positioned singly adjacent to each said opposing side, said second tubes extending transversely from said back end of said bed, said second tubes extending in parallel to said bed, said second tubes being substantially rectangularly shaped when viewed longitudinally;

a pair of outriggers, each said outrigger comprising:

a third tube, said third tube being complementary to a respective said second tube such that said third tube is insertable into and slidably couplable to said respective said second tube, a fourth tube coupled to and extending perpendicularly from an end of said third tube, a roller coupled to said fourth tube distal from said third tube, and wherein said second tube is positioned on said bed such that said second tube is configured for insertion of said third tube of said outrigger such that said outrigger is coupled to said bed, wherein said outriggers are configured stabilize said bed;

a chain coupled to said lift arm, said chain being reversibly couplable to said crossbar, wherein said chain is positioned on said lift arm such that said chain is couplable to said crossbar such that said lift arm is immobilized; and wherein said fastener is positioned on said lift arm such that said fastener is configured to couple said lift arm to a load, wherein said actuator is positioned to motivate said lift arm and said fastener upwardly, such that the load coupled to said lift arm is elevated from a first resting position to a raised position, wherein said trailer is wheeled and couplable to a vehicle, such that said trailer and the load are movable, and wherein said actuator is positioned to motivate said lift arm and said fastener downwardly, such that the load coupled to said lift arm is lower from the raised position to a second resting position.

* * * * *